Nov. 2, 1948. H. A. HOOPER 2,452,657
FOOD PROCESSING APPARATUS
Filed April 23, 1945 4 Sheets-Sheet 3

INVENTOR
HUBERT A. HOOPER

BY Fetherstonhaugh & Co.

ATTORNEYS

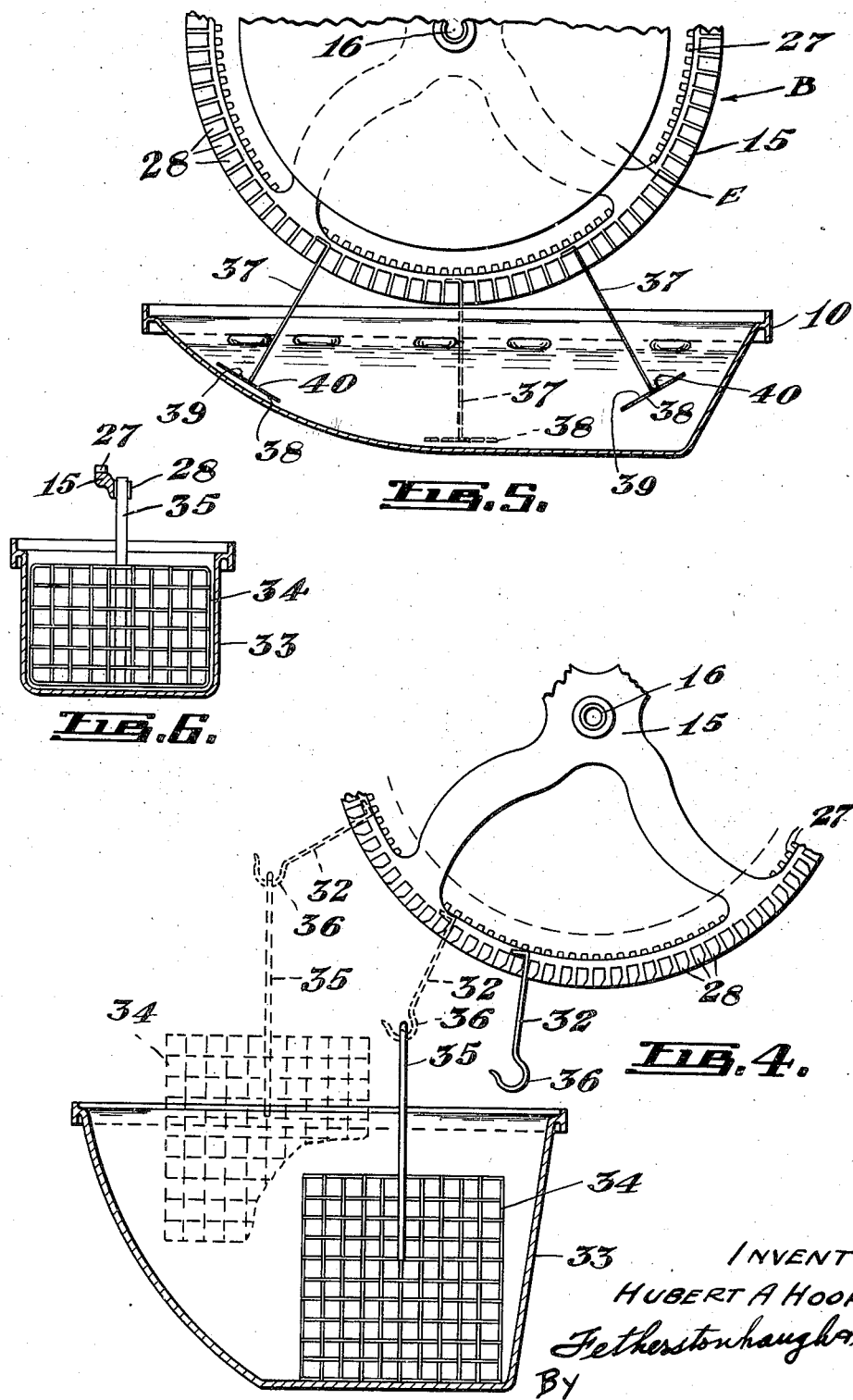

Patented Nov. 2, 1948

2,452,657

UNITED STATES PATENT OFFICE 2,452,657

FOOD PROCESSING APPARATUS

Hubert A. Hooper, Brantford, Ontario, Canada

Application April 23, 1945, Serial No. 589,845

8 Claims. (Cl. 99—343)

This invention relates to food processing machines and particularly concerns machines for immersing food in a cooking liquid for predetermined periods of time.

Up to the present time food cooking machines have been proposed employing mechanism for immersing food carriers containing food into a cooking liquid over a predetermined set period of time including conveyor mechanism for passing the carriers through the liquid. While such machines are useful in the cooking of certain types of foods which require the same length of time of immersion they are not well adapted to the cooking of other foods requiring a greater or lesser length of time of immersion. Usually any change in the time of immersion must be provided through change in speed of the conveyor mechanism. Moreover, in most cases this type of apparatus will not provide for uniform cooking of the food because of the fact that during the period of time taken for removal of the food from the liquid the lower part of the food product will be cooked to a greater extent than the uppermost parts as the food products are raised from the immersion tank. Furthermore, in many cases where foods requiring a different time limit of immersion are cooked in such machines the variation in time limit must be guessed by the operator and while in some instances the operator may guess approximately, in others he will not, so that when it is attempted to handle in one machine food products requiring a varied time limit of immersion, non-uniformly cooked products will more often result. Apart from these general disadvantages, in most cases such apparatus is naturally complicated in construction and therefore relatively costly.

The present invention avoids such disadvantages of prior machines and provides additional advantages.

It is therefore an object of the present invention to provide a simple machine for the immersion cooking of foods which will provide for the uniform cooking of such foods regardless of variation of time limit necessary properly to cook various foods.

A further object of the invention is to provide a machine of this kind through which an inexperienced operator may be enabled to cook expertly with but a very brief period of instruction.

A further object of the invention is to provide a machine of this kind which at the end of the immersion cooking period will remove the foods at an accelerated speed compared to their normal speed of travel through the cooking liquid thereby to avoid over-cooking of the under portion of the food products.

A further object of the invention is to provide a machine of this kind which incorporates a gauge through which the accurate cooking of varied types of foods may be assured.

A still further object of the invention is to provide a machine of this kind through which foods required on short notice may be partially precooked to a predetermined degree and may be wholly cooked on short notice when required, thus providing a uniformly cooked product on short notice while also making it possible to use the machine during slack periods and thus retain the cooking liquid in substantially constant use to avoid deterioration of the cooking liquid.

A still further object of the invention is to provide a machine of the character referred to which may be used in conjunction with a tank of minimum size whereby to maintain the volume of cooking liquid used at a minimum.

A still further object of the invention is to provide a machine of this kind including indicia, to indicate a series of uniform periods of immersion correlated to predetermined periods required for cooking various food portions and a simple means of immersing such portions for the selected period of time which is indicated to the operator, and wherein the said immersing means is designed to accommodate variously timed food portions as well as portions requiring the same time of immersion, without interfering one with the other.

With these and other objects in view the invention generally comprises a rotary member including a means for rotating said member at a predetermined speed in combination with a liquid receiving receptacle, a means of connecting food carriers thereto at selected demarked points on the rotary member for immersion within the liquid receptacle over a predetermined period of time and a means for removing the food carrier from the liquid receptacle at the accelerated speed upon the termination of the cooking period. The invention applies to the cooking of the various types of food products and preferably includes accessories to provide for substantially automatic cooking operations in all respects.

The invention will be clearly understood by reference to the following detailed specification taken in conjunction with the accompanying drawings.

In the drawings:

Fig. 4 is a sectional detail showing the invention adapted to the immersion of food products in baskets or the like such as in the boiling of eggs and the like.

Fig. 5 is a sectional detail of the cooking apparatus shown as adapted for the cooking of doughnuts, and Fig. 6 is a sectional detail of the apparatus of Fig. 5.

Figure 1:
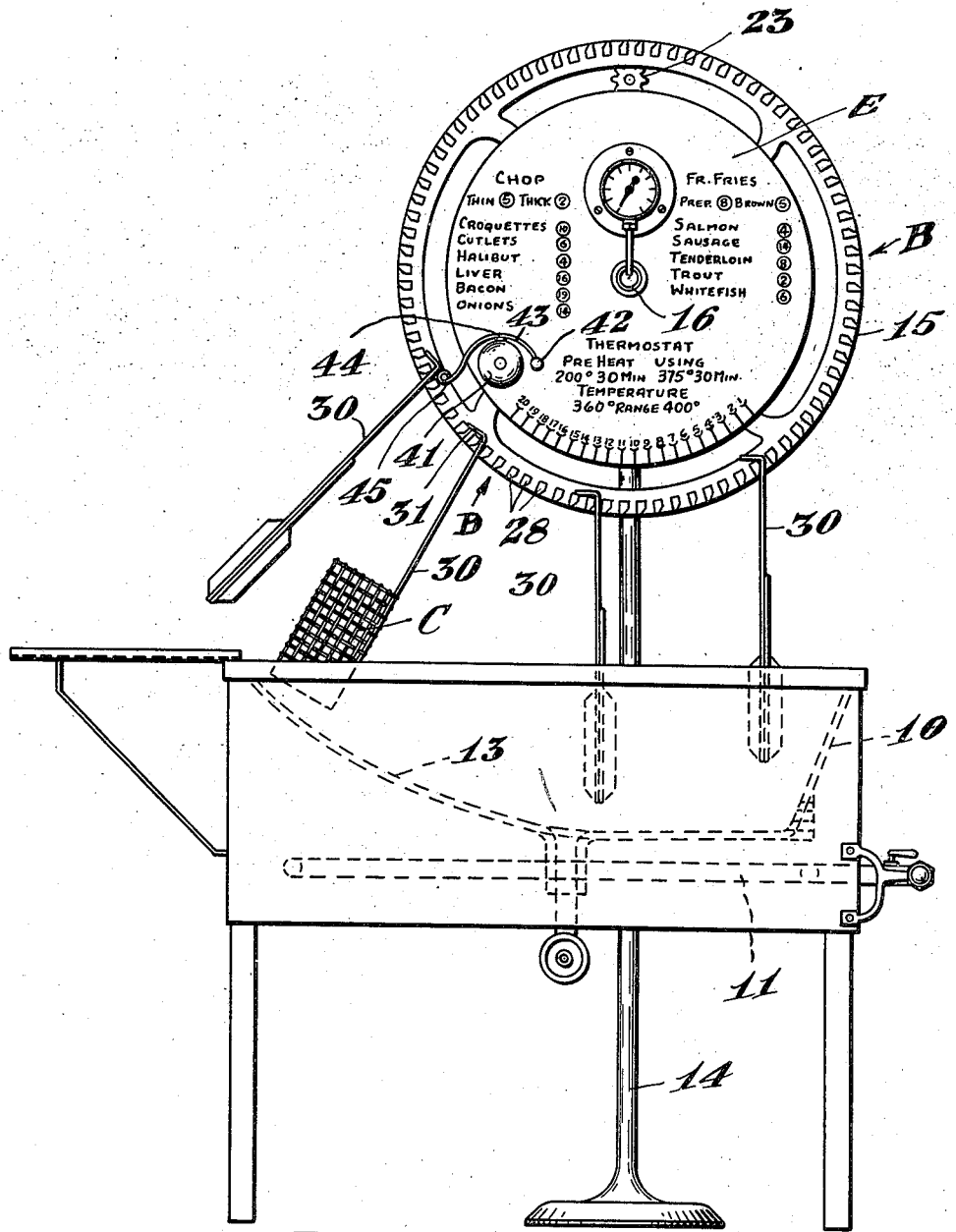
Fig. 1 is a front elevation of the apparatus according to the present invention.
Figure 2:
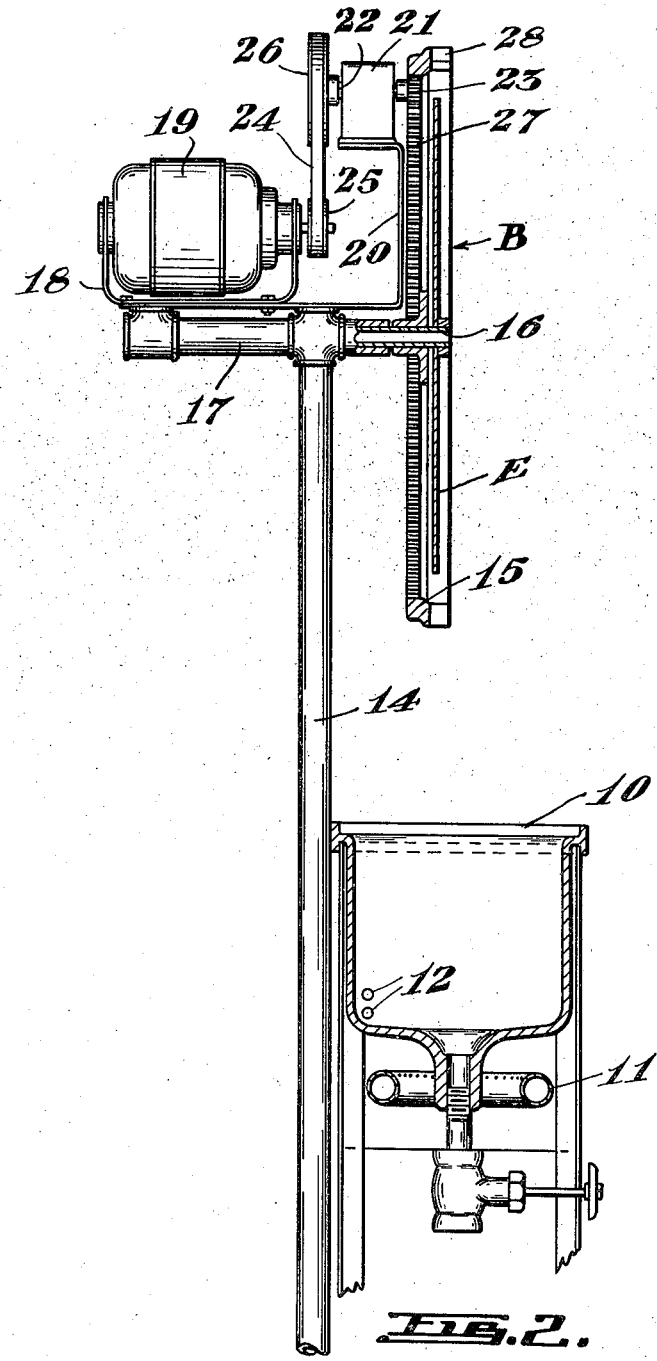
Fig. 2 is a side elevation of the apparatus with the cooking tank partly in section.
Figure 3:
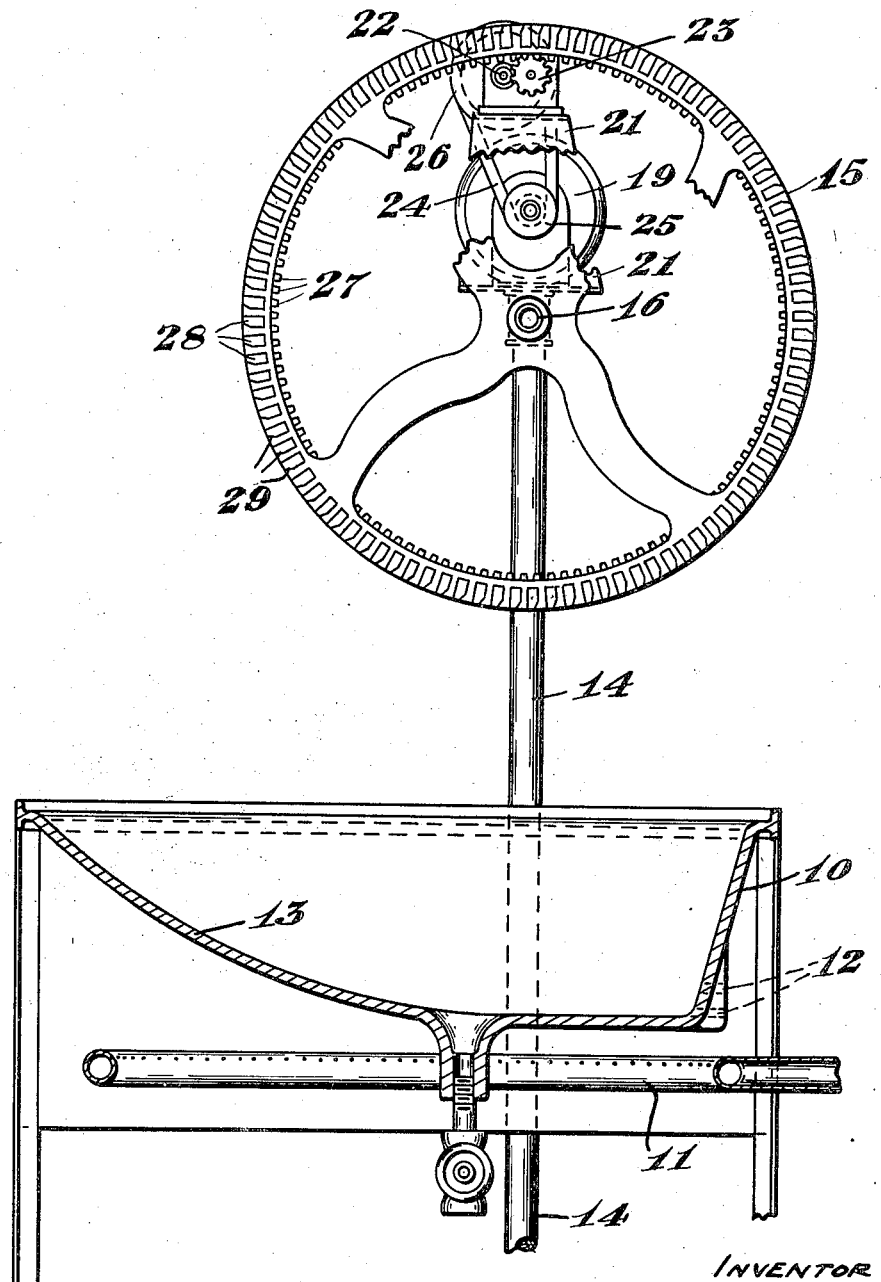
Fig. 3 is a view similar to Fig. 1 but showing the apparatus partly in section.

Referring to the drawings, A indicates the cooking apparatus as a whole which includes a tank 10 designed to receive the cooking liquid which is disposed in conjunction with a burner 11 or other suitable heating medium so as to heat the liquid in the tank to the desired temperature and maintain it at desired temperatures. The tank is fed in any suitable manner and preferably includes suitable openings such as 12 to carry a thermostat and/or thermometer for the more minute temperature control of the immersion liquid. The cooking tank is preferably shaped to include the gradually curved end 13 whereby to provide for a minimum quantity of cooking liquid consistent with the operation being carried out.

Associated with the cooking tank is a food feeding and timing apparatus generally indicated by the letter B. This is preferably carried on a standard 14 and includes a wheel 15 which is mounted on the stub shaft 16 projecting from the standard. However, it will be understood that any suitable mounting may be employed. In the present illustration the standard 14 is laterally projected as at 17 to form a motor mounting 18 designed to carry the motor 19. This motor mounting also includes a projecting bracket 20 forming an elevated shaft mounting 21 carrying the transverse shaft 22 and spur gear 23. The motor is connected with the shaft 22 by means of the belt 24 which extends between the motor drive pulley 25 and the driven pulley 26 rigidly fastened to the shaft 22.

The wheel 15 is formed with a ring gear 27 which is disposed rearwardly of the face of the wheel and is designed to mesh with the spur gear 23. Consequently, upon operation of the motor 19 it will be appreciated that the wheel 15 will be caused constantly to rotate. Furthermore, this wheel will rotate at a given speed dependent upon the speed of the motor and the ratio between the pulleys 25 and 26, as well as the size of gear 23.

On the outer face of the wheel 15 I provide a series of spaced apart lugs or mounting projections 28 which are radially disposed relatively to the centre of rotation and are spaced apart a suitable distance such that the adjacent lugs may co-act together in a manner hereinafter to be described. One face of each lug is chamfered as at 29. These lugs are designed to provide a means for mounting and moving food carriers such that they will be caused to enter the tank 10 and will be immersed in the liquid for a predetermined period of time and then quickly withdrawn at the end of the set period.

As shown in Fig. 1 the food carriers may comprise a basket C having an elongated handle 30 provided with a hooklike extremity 31. In this connection the handles 30 are designed to be projected between one pair of the lugs 28 and the hooklike element 31 lapped over one of the lugs. Thus, as the wheel rotates, the baskets positioned on the lowermost section of the wheel 15 will be immersed in the liquid and, as the wheel rotates, caused to pass therethrough for a predetermined period of time.

Moreover, as will be clearly understood, when a given carrier has been rotated by the wheel approximately to the position shown by the arrow D, the handle 30 will tend to bind on the adjacent faces of the lugs between which it is positioned and this binding action will result in a rigid gripping of the handle so that, as the wheel 15 continues its rotation, the rigid grip on the handle will accelerate the movement of the food carrier from the cooking liquid. As a result, therefore, it will be appreciated that when each food carrier moves through the body of liquid approximating its predetermined period of time, the accelerated movement of the carrier at this point will cause removal of the carrier from the liquid within the time limit provided and such accelerated movement will avoid over-cooking of the bottom portion of the food product which otherwise would result if the carrier was removed from the liquid at approximately the same speed of travel it assumes during its major period of travel in the cooking liquid.

The apparatus preferably includes a dial face E which over a lowermost portion of its perimeter is divided into a scale, the sections of which correspond with the location of the spaces between the lugs 28. This scale is divided into 20 sections based on the principle that the maximum period for deep fat cooking does not require more than 4 minutes. Thus, the graduations of the scale represent 12 seconds. Consequently, if it is desired to cook a product which required a maximum time limit, the arm 30 of the carrier would be disposed between the two lugs which at the time were disposed directly adjacent No. 1 graduation on the scale. Thus, the carrier would be immersed in the cooking liquid, hanging by the hooklike member 31, for approximately 4 minutes, at which time the space in which the handle 30 of the carrier is disposed would be brought to graduation 20 of the scale. However, at this point the angle of the handle 30 with respect to the lugs between which it is disposed has changed and the lugs have started to bind on the handle 30. Consequently, the speed of movement of this carrier is accelerated and the carrier is quickly removed from the liquid.

I have found that I am able to maintain the food in the cooking liquid by this method within a 6 second differential. For instance, if a slot has travelled halfway between adjacent graduations carrying a food holder, a second food holder and its food portion requiring the same time of cooking would be placed in the slot behind, which thus represents a 6 second difference in timing. Moreover, if a food carrier held in the machine were disposed opposite a graduation for starting the cooking of a food portion which requires a different timing interval, it is only necessary to wait until the food carrier located at this particular point has moved halfway between adjacent graduations so that the second food product is inserted and cooked within a 6 second time differential.

The dial preferably carries indicia listing various foods and opposite to each of them the graduation of the scale at which they should be disposed to provide for the correct cooking time. Therefore, merely by looking at the dial and selecting the appropriate graduation therefrom, having regard to the food that is being cooked, it is only necessary for the operator to dispose the handle 30 in the space between the two lugs that are then disposed opposite to the graduation of the scale in question. It follows, therefore, that the food will then be immersed in the cooking liquid for the appropriate length of time and in each case it will be uniformly cooked as required. This is, of course, true in connection with repeat orders and it is, therefore, apparent that by use of this apparatus the restaurant, hotel or the like can be assured that the food will always be cooked with that exactitude which is necessary to the culinary art. It will also be clear that it would not require a skilled operator to provide for this perfection of cooking since it is only necessary for an operator to realize the cooperation between the indicia and the scale, having regard to the food being dealt with at the time, and to make certain that the food carrier is accurately disposed in the space opposite the appropriate graduation of the scale.

The machine has an unlimited capacity for any index number, due to the constant rotation of the wheel which provides available slots opposite any index number. Moreover, the machine automatically provides against overloading of the cooking liquid, and consequent reduction in the temperature of the liquid, since it is only possible to introduce a predetermined number of food receptacles to the liquid over the cooking period as governed by the index scale. On the other hand, the additional food products to be cooked can be added at twelve second intervals as the previous orders immerge from the cooking liquid. The invention also permits the cooking of two different food portions having a different time requirement which may comprise one complete serving portion when finished. For instance, upon referring to Fig. 1, it will be noted that a food carrier holding liver is placed in the slot opposite No. 16, while bacon which is usually associated with liver and frequently ordered with its requires to be placed in the slot opposite No. 19. Consequently, when the holder carrying the liver has moved from 16 to 19 the bacon can be introduced to the receptacle and when that receptacle is removed from the cooking liquid at the end of the normal period for cooking the liver, a complete serving of liver and bacon properly timed in relationship to each other results. Similarly, ham and fritters and other similar companionate food portions may be dealt with in exactly the same way. This naturally facilitates the cooking of such companionate food portions with different interval timing requirements.

It will also be appreciated that this cooking machine will lend itself to the partial cooking of certain foods so that they can be finished in short order, when required. This, likewise, will provide for the use of the machine during slack periods to build up for peak periods and thus the cooking liquid is kept in use which is a factor in avoiding deterioration of the cooking liquid which usually happens when it is not continuously used. For instance, in the cooking of French fried potatoes, it is a very simple matter to partially cook them by causing them to pass through the cooking liquid for half the time required to cook them and then when they are required, to finish cooking batches of them in a portion of the period that otherwise would be required for their proper cooking. This will permit the serving of hot food cooked to the proper degree and will avoid the practice of fully cooking the food ahead of demand and reheating it when required which is often a necessary practice with known equipment and which is not only detrimental to the consumer's health and palate but is also detrimental to the reputation of restaurant, hotel or the like from the standpoint of quality. Accordingly, it is obvious that the present invention permits cooking of food portions as required at the time of consumption while avoiding these serious disadvantages. Furthermore, if an order being cooked was cancelled, due to circumstances beyond the operator's control, it is only necessary for the operator to remove that food carrier, noting the index number where it was located at the time, and the food carrier containing the partially cooked portion can be reinserted in the machine at a later time at the same index number to provide for the remaining period of cooking required. This results in saving the food portion which might otherwise be discarded as waste.

The machine is adapted to cooking various types of food products. On the one hand, it is particularly adaptable to cooking in deep fat or oil. On the other hand, it is adapted to cooking in water such as in the boiling of potatoes, boiling of eggs, etc., requiring interval timing. In this connection reference is made to Fig. 4 wherein the timing apparatus B is substantially the same including the spaced apart lugs 28 although in this instance the spaces between the lugs are slightly less. In place of food carriers, I provide the hooklike elements 32 which are hooked over the lugs in a similar manner and, therefore, are caused to move past a cooking tank 33 in a somewhat similar manner. For this purpose I employ food carriers in the form of baskets 34 provided with vertically disposed rigid bails 35 which are disposed to project above the upper end of the cooking tank 33 and directly in the path of the hooklike portions 36 of the members 32. Consequently if a hooklike member is disposed between lugs at a given point as in the previous case, it will be apparent that the hooklike member will move with the rotary timer over a given time limit until its hook is disposed within the bail 35 of the food carrier 34. At this point binding between the lugs 28 and the element 32 has begun to take place and the food carrier will be lifted out of the tank at an accelerated rate. As a result, therefore, boiled eggs, etc., may be uniformly cooked by the same method. Moreover, it will, of course, be evident that if by adding to the wheel 15 laterally projecting bars instead of the lugs 28 with means such as notches therein a plurality of hooklike members 32 may be positioned at a point corresponding to the same graduation on the scale; whereas by employing an elongated cooking vessel across the path of these hooklike members or a plurality of cooking vessels disposed so that a plurality of food carriers 34 may be immersed at one time, it is possible to cook with a plurality of food carriers at the one time.

As a further means of illustrating the versatility of the present method, reference is now made to Fig. 5. In this case, substantially similar apparatus is employed to that shown in Fig. 1 with the exception that the spaces between the lugs are slightly less than in the case of Fig. 1. Moreover, instead of food carriers such as employed in Fig. 1, I propose to employ wire paddles 37 formed with a base 38 at right angles thereto and providing the ledges 39 and 40 on each side of the paddle body. This is particularly adaptable to the cooking of doughnuts, and in this instance the doughnuts are disposed on that side of the paddle body 37 carrying the ledge 40 so that as the paddle is gradually introduced to the cooking liquid, it will release the doughnuts from it and by means of the ledge 39 and the opposite side of the paddle body doughnuts in the liquid in advance of said paddle and deposited by the previous paddle will, within a predetermined time, be picked up. As a result, therefore, doughnuts may be introduced to the cooking liquid in an automatic manner for a predetermined length of time and removed with accelerated speed at the appropriate time as in the case of the accelerated removal of other food products previously described.

I prefer to include with the apparatus a means of indicating the completion of food portions as they are raised from the cooking liquid.

In Figure 1, I have illustrated an automatic signal which includes a bell 41 and bell hammer 42, the latter carried on an arm 43 pivotally mounted intermediate its ends as at 44. The opposite extremity 45 of the arm 43 is disposed directly adjacent to the inner extremity of the lugs 28 so that it will just clear these lugs. However, when a food holder is mounted between any pair of these lugs, as shown in Fig. 1, the end of the shank of the food holder projecting past the inner extremity of the lugs will be disposed directly in the path of the extremity 45 of arm 43, so that the latter will be actuated after the food holder passes the point of location of this arm, audibly to signal the removal of a food portion from the cooking liquid.

In all cases of use of this apparatus it will be noted that a lower section only of the rotary member or wheel is used in the processing operation. In other words, the processing operation occurs within a predetermined arc of travel of the rotary member, using the currently lowermost section of the wheel as it rotates. The graduated scale or index is disposed in corelation to this specific arc of travel and the food carrier or food lifters are attached to this currently lowermost section at the appropriate location within the arc, as selected by the operator. The selection of courses is determined by the scale according to the species of food to be processed. Obviously the current lowermost section changes constantly as the leading receiving or suspending means of the wheel within said arc of travel move out of the latter and leading receiving or suspending means in advance of said arc move into it.

It will be apparent that the present invention is readily adaptable to the controlled timing of food cooking in various fields of food cooking. It provides also an easy means for very accurate cooking even though the food portions may vary somewhat from a normal average size. In this latter respect an operator with little practice can cook accurately with the machine. By reason of the graduated scale it is easy for the operator slightly to increase or reduce the cooking period where the food portion varies from the average. In this case, the operator may place the food carrier at a point one number on the scale in advance of the point he would normally select thereby reducing the cooking period by 12 seconds and conversely he may correspondingly increase the cooking period by placing the food carrier one number behind that normally required, depending on whether or not, the food portion is smaller or larger (thicker or thinner), than the average.

Accurately controlled timing of food cooking, as readily permitted by the present invention, is of primary importance, not only from the important point of view of digestive quality of the cooked foods as well as the consumers' satisfaction, but the cooking operations carried out by the present invention necessarily result in a decided saving of crucial fats in deep frying. This is brought about by avoiding fat absorption as in previous practice due to temperature drop of the cooking liquid, as a result of overloading the food receptacle, which is clearly avoided by the present invention. Moreover, the manner of cooking according to the present invention results in a marked saving of food by avoiding spoilage from over cooking, since the accurate interval timing made possible by the timing principle of the present invention as it is applied to varied interval cooking avoids any possibility of overcooking. Thus, the average case of substantial waste from day to day in the restaurant field, etc., occurring at present is avoided.

The foregoing will serve to illustrate the principle and general characteristics of the present invention from which it will be realized that the apparatus is simple, does not require a skilled operator, yet will provide for the uniform cooking of various types of food products which, having regard to the nature of the cooking required, may be readily handled in easily adapted ways.

It should be understood that the term "scale," "graduated scale" or "index" as used in this specification is designed to include any visual means associated with the rotary member for permitting selected interval timing of food portions.

The term "shank" where it occurs in the appended claims is intended to apply to the handle 30, the hook-like members 32 and the members 37 disclosed in the accompanying drawings, all of which may properly be termed shank members.

While I have disclosed generally preferred forms of structure in the accompanying drawings, it will be apparent that changes may be effected in structure without departing from the principle of the invention and which may lie within the scope of the appended claims.

What I claim as my invention is:

1. Food processing apparatus used in combination with a container carrying a processing medium, comprising a rotary member disposed substantially in a vertical plane, circumferentially spaced apart means on said rotary member for detachably carrying a shank designed for moving a food carrier, a graduated scale in connection with said rotary member coinciding with a lower arc of the latter and indicating interval cooking periods for various foods, said shank carrying means, on the rotary member, moving arcuately past said scale, said shank being connected by an operator with said shank carrying means of the rotary member opposite to the graduation of the scale corresponding to the processing period required for the particular food to be processed, said rotary member lifting the food carrier from the processing medium when said shank receiving means moves beyond the end of said scale.

2. Food processing apparatus in combination with a receptacle containing a processing medium comprising a rotary wheel, means for rotatably mounting the latter adjacent to said receptacle and in a substantially vertical plane, means for rotating said wheel, the latter having a plurality of means circumferentially spaced apart adjacent to its periphery for detachably receiving and suspending food carriers therefrom, the latter moving with said wheel being attached on a currently lowermost section of, and within a predetermined arc of travel of, said moving wheel, said carriers designed to introduce food carried thereby to the medium in said receptacle, said receiving means being formed loosely to suspend said carriers from said wheel during a portion of the travel of said lowermost section through said arc and to rigidly grip said carriers over the remaining portion of said arc of travel, said carriers moving through and from the processing medium at an increased speed of travel when rigidly gripped, and a graduated scale cooperating with the lowermost section of said wheel and coinciding with said predetermined arc of travel of said wheel, the graduations of said scale being correlated to said receiving means and indicating particular receiving means within said arc of travel for receiving food carriers according to the food carried whereby to select the time during which a given species of food remains in said processing medium.

3. Food processing apparatus as claimed in claim 2 in which said receiving means comprises a plurality of circumferentially spaced apart lugs projecting from said wheel substantially at right angles thereto and forming spaces therebetween to detachably receive a part of said carriers, a face of each of said lugs being graded to cause loose suspension of a carrier vertically into said medium during the first part of its movement through said arc of travel, an opposite part of said lugs cooperating with a part of a preceding lug to grip said carrier rigidly during the latter part of its movement through said arc of travel.

4. Food processing apparatus as claimed in claim 2 in which said means of rotating the wheel comprises a plurality of gear teeth on said wheel, a meshing gear and a motor for rotating said gear.

5. Food processing apparatus as claimed in claim 2 in which said wheel is rotatably mounted on a portable standard, the latter being disposed beside the receptacle.

6. Food processing apparatus as claimed in claim 2 in which signalling means is included operable by said food carriers when they move out of said predetermined arc to indicate the completion of the processing.

7. Food processing apparatus used in combination with a receptacle containing a processing medium comprising a rotary member designed to rotate substantially in a vertical plane, said member having means circumferentially spaced apart adjacent its periphery for receiving food carriers, means for rotating said member and attached food carriers, the latter being attached to said rotary member on the lowermost section of the member within a predetermined arc of travel of the latter, a stationary dial, a graduated scale on said dial and correlated to said predetermined arc of travel, the graduations of said scale being correlated to said receiving means as they move through said predetermined arc of travel to indicate particular receiving means for receiving food carriers determined by the species of food to be processed and the time limit of processing, an indicia on said dial indicating the time limits of processing required in connection with various species of food, said indicia being correlated to the graduated scale, said rotary member lifting a food carrier from the processing medium as said carrier moves towards the end of said predetermined arc of travel.

8. Food processing apparatus used in combination with a processing medium comprising a rotary member designed to rotate substantially in a vertical plane, said member having a plurality of lugs circumferentially spaced apart and projecting substantially at right angles therefrom to form spaces therebetween for detachably receiving food carriers, said lugs being spaced apart a distance loosely to suspend a food carrier in the processing medium during a portion of the movement through a predetermined arc of travel of said rotary member, adjacent pairs of lugs defining a space for receiving a food carrier, said lugs functioning rigidly to grip said food carrier when the rotary member moves it through a final portion of said arc of travel, to remove said carrier from said processing medium, said rigidly gripped carrier moving at a speed accelerated to that of a loosely suspended carrier, said lugs being chamfered on one side to cause said food carriers loosely to depend substantially vertically into the processing medium as it is introduced thereto at one extremity of said predetermined arc of travel of said rotary member, the opposite sides of said lugs extending radially of said rotary member and forming, with a portion of a preceding lug, means for gripping said food carrier rigidly as said carrier is moved adjacent to the opposite extremity of said predetermined arc of travel, thereby accelerating the rate of travel of said food carrier towards the end of said arc.

HUBERT A. HOOPER.

REFERENCES CITED

The following references are of record in the file of this patent:

UNITED STATES PATENTS

| Number | Name | Date |
|---|---|---|
| 1,159,537 | Shields | Nov. 9, 1915 |
| 1,520,498 | Jenks et al. | Dec. 23, 1924 |
| 1,580,684 | Scheidigger | Apr. 13, 1926 |
| 1,630,676 | Smith | May 31, 1927 |
| 1,634,142 | Hammond | June 28, 1927 |
| 1,781,411 | Reiber | Nov. 11, 1930 |

FOREIGN PATENTS

| Number | Country | Date |
|---|---|---|
| 489,559 | Germany | Jan. 22, 1930 |
| 655,057 | Germany | Jan. 7, 1938 |